June 30, 1931.  T. ZUSCHLAG  1,812,392

METHOD OF AND APPARATUS FOR LOCATING TERRESTRIAL CONDUCTING BODIES

Filed March 6, 1929

INVENTOR
Theodor Zuschlag.
BY
ATTORNEYS

Patented June 30, 1931

1,812,392

UNITED STATES PATENT OFFICE

THEODOR ZUSCHLAG, OF NEW YORK, N. Y., ASSIGNOR TO SWEDISH AMERICAN PROSPECTING CORPORATION, OF NEW YORK, N. Y., A CORPORATION OF NEW YORK

METHOD OF AND APPARATUS FOR LOCATING TERRESTRIAL CONDUCTING BODIES

Application filed March 6, 1929. Serial No. 344,897.

This invention relates to the detecting and locating of terrestrial or other conducting bodies such as ore deposits, metals, water courses, salt water beds, moist ground and the like. More particularly, it relates to an electromagnetic device for determining the effects produced by such conducting bodies when an electromagnetic field is generated in their vicinity, and a method of locating and determining the proximity of the conducting bodies by the use of such a device.

Various devices have come into more or less general use for locating terrestrial conducting bodies electromagnetically by detecting the direction and magnitude of disturbances produced by such bodies when an electromagnetic field is generated in their vicinity. Ordinarily, such devices comprise means for generating an electromagnetic field of calculated strength and means for detecting the effects caused by conducting bodies due to this field. If such detecting means be operated at a number of different points and the observed results properly interpreted, the location of the conducting body or bodies can be readily determined.

One example of such class of devices is the induction balance. Induction balances utilize the well known fact that generated alternating electromagnetic fields induce secondary fields in any conducting body which they permeate. The strength of these secondary fields is determined by the arrangement, dimensions, power and frequency of the exciter circuit; the thickness and electrical properties of the medium intervening between the exciter circuit and the conducting body; and the dimensions and electrical properties of the conducting body itself.

When using an induction balance, the secondary fields may be detected by using the balance in one of several ways, either connecting the exciter circuit in a bridge arrangement, the balance of which is disturbed by the induced E. M. F. of the secondary field, or by placing an independent receiving coil in a neutral position such that the exciting or primary field will induce only a very weak E. M. F. or none at all, while the secondary field will induce a much stronger E. M. F. in the coil. Still another way is to connect two or more receiving coils in such manner that the primary E. M. F.'s induced in the receiving coils tend to compensate one another, while the secondary E. M. F.'s are not thus affected and accordingly can be observed.

However, although these general principles have been known for many years and although induction balances possess advantages which recommend them over other forms of electromagnetic detecting devices of similar or related character, they have never come into extended use in practical field work because they have not possessed a working range of more than a few feet.

Thus, the bridge type of balance is capable of detecting only such conducting bodies whose secondary fields change the resultant E. M. F. in one of the bridge arms at least one-tenth of one percent, which represents the normal limit of accuracy of bridge measurements and is realized only if a fairly large and highly conductive body is located in favorable position and relatively close proximity.

The neutral position type, on the other hand, has the inherent disadvantage that not only the primary or exciter field but also the induced secondary fields are generally weak in a direction perpendicular to the neutral plane. Moreover, even in this plane a considerable amount of primary field inductive effect is noticeable in the receiving coil, due to the close relation between the exciter and receiving circuits. Accordingly, a true balance cannot be obtained because there will be a more or less pronounced sound, if, as usual, a telephone is used for indicating the balance point. This fact, therefore, practically requires that the secondary E. M. F.'s be at least approximately 25% of the primary E. M. F. induced in the receiving coil, otherwise the human ear will be unable to detect a variation in the strength of the sound. To achieve this requirement, however, it is again necessary that a fairly large and highly conductive body be located in favorable position and relatively close proximity.

The third mentioned type, that employing compensating receiving coils, can be built in such manner that the receiving coils are disposed in the most favorable position with respect to the inductive effect of the secondary fields. Even so, however, the primary inductive effects cannot be entirely eliminated, no matter how the receiving coils are arranged. Accordingly, the degree of sensitivity is considerably less than is desirable, because of the difficulty in obtaining a true balance, and the working range is limited as a consequence.

In order to utilize as far as possible the many advantages of induction balances as electromagnetic detecting instruments and yet eliminate the various disadvantages which have been enumerated as concomitant with their practical operation, I have devised an improved form of induction balance which is possessed of a sensitivity and working range far beyond that of the devices now in use. Broadly speaking, my construction constitutes an induction balance of the compensating type and utilizes one or more compensating devices to eliminate entirely in the receiving coil circuit all induced E. M. F.'s due to the primary field. Accordingly, it is possible, by means of my improved arrangement, to more accurately determine the direction and source of observed secondary field effects and also to determine the approximate distance to such source.

By virtue of the improvements which I have conceived and developed I am enabled to provide a satisfactory practical embodiment of the induction balance principle in a detecting device applicable not only to the field of electromagnetic prospecting, but also to other situations involving the determination of the distance between a given point and some terrestrial conducting body in the vicinity.

Considering my invention more specifically, it includes an induction balance comprising an exciter or primary field generating coil connected to an alternating current generator or oscillator, and two or more receiving coils attached to the exciter coil in such manner that all the coils lie in the same plane. The exciter coil and the receiving coils are connected with suitable compensating and amplifying devices in such wise that the E. M. F.'s induced in the receiving coils by the exciter circuit are compensated or eliminated entirely, while the E. M. F.'s induced in the receiving coils by the secondary fields of the conducting bodies it is desired to locate are received and amplified in undiminished strength. These secondary E. M. F.'s accordingly can be investigated under conditions which are free of any undesired influences due to the induced primary E. M. F.'s.

The size and general arrangement of the exciter and receiving coils may be varied to suit practical needs, although it should be remembered that too great a limitation of the size of the coils for the sake of portability tends to reduce the practical working range of the apparatus. Ordinarily an exciter coil having an area of several square feet and a winding of several turns of copper wire will be found satisfactory. To permit placing of the coils in various positions, it is likewise preferable that the exciter coil be rotatably mounted in such manner as to be capable of rotation into any desired horizontal, vertical or inclined plane. In order that the receiving coils may be retained in the same plane as the exciter coil throughout various positions, they may be rigidly attached to the exciter coil, so as to rotate therewith or otherwise connected to achieve the same result. The general frame work for supporting the coils may be similar to the constructions well known in the art, a light wooden frame suitably protecting the turns of wire of the coils being perhaps most satisfactory. It is to be understood, however, that my invention is not concerned with the supporting frame work for the coils and accordingly is not to be construed to be limited to any particular structure which may be employed.

In order that my invention may be better understood, reference is made to the accompanying drawings, which, together with the description relating thereto, serve to illustrate by way of example one embodiment of the invention I have disclosed.

Figure 1:
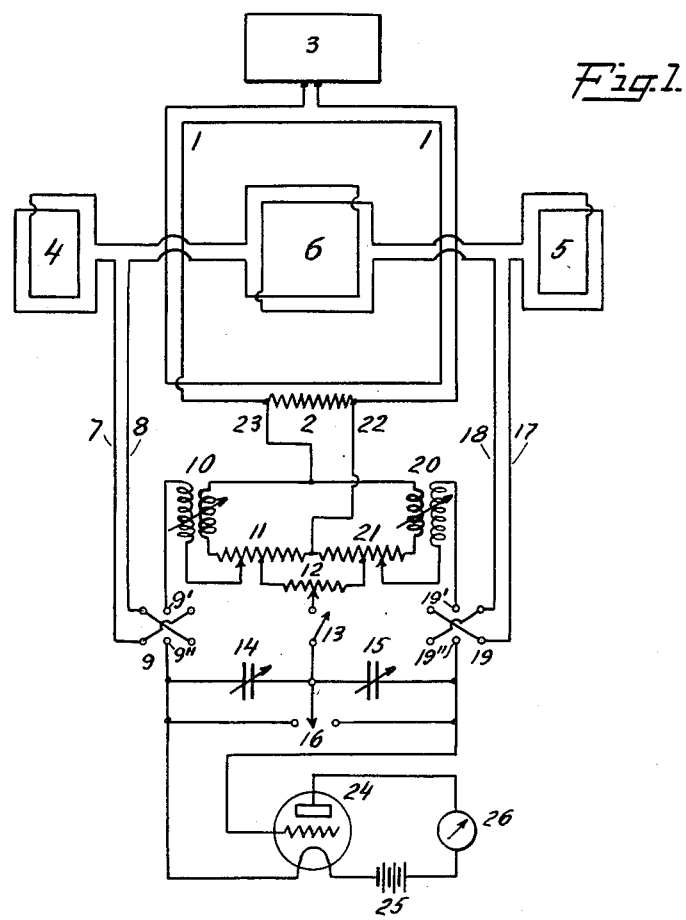
Fig. 1 is a schematic representation of a device in accordance with the invention.

Considering the drawings more in detail, an exciter or primary field generating coil 1, possessing an area of several square feet and composed of a winding of several turns of wire, in series with a coupling reactance 2, is connected to an alternating current generator or oscillator 3. Two identical receiving coils 4 and 5, each inclosing the same area and composed of the same number of turns, are arranged on each side of the exciter coil 1 and in the same plane therewith. A third receiving coil 6, located within the limits of the exciter coil and likewise in the same plane therewith, is composed of two separate and equal windings each of which is connected to one of the receiving coils 4 and 5. All of the coils are wound in the same direction.

The circuit of coil 4 and its associated winding of coil 6 is connected by leads 7 and 8 to a reversing switch 9, while the circuit of coil 5 and its associated winding of coil 6 is connected similarly by leads 17 and 18 to a reversing switch 19. One pole 9′ of the switch 9 is connected in series with the secondary of a variometer 10 and the arm of a potentiometer 11. Likewise, one pole 19′ of the switch 19 is connected in series with the secondary of a variometer 20 and the arm of the potentiometer 21. The two potentiometers 11 and 21 are connected in series with the primaries of the variometers 10 and 20 and have their centers connected to a third potentiometer 12. The arm of the potentiometer 12, in turn, is connected through switch 13 to the common connection of two series variable condensers 14 and 15 and to a switch 16, by means of which either of the condensers may be short circuited. To complete the circuit, the outer side of condenser 14 is connected to pole 9" of the switch 9 and the outer side of condenser 15 is connected to pole 19" of the switch 19.

The coupling reactance 2 is connected to the compensating variometer and potentiometer circuit by leads 22 and 23, the former being joined to the common connection between the series potentiometers 11 and 21 and the latter to the common connection between the primaries of the variometers 10 and 20. To obtain coupling, inductance, capacitance or resistance may be used for the reactance 2. For simplicity, only a resistance has been shown.

The amplifying circuit comprising an amplifying and detecting tube 24, a battery 25, and a suitable indicator 26, which may be either a galvanometer or a telephone, is connected across the condensers 14 and 15, the grid of the tube being connected to one condenser and the filament to the other.

With the apparatus connected as described and the generator or oscillator 3 in operation, adjustment is obtained by bringing all variometers and potentiometers to a neutral position, closing switches 9 and 13 and closing switch 16 to short circuit condenser 15. The circuit of coil 5 is then disconnected by placing the reversing switch 19 in neutral position, and the distance between coil 4 and coil 1 is varied, by moving the coil 4, until the indicator 26 gives a minimum reading or indication of the current induced in the circuit of coil 4 by the coil 1. This minimum is then reduced to absolute zero by adjusting variometer 10, and potentiometer 11, at the same time turning the circuit by means of the variable condenser 14.

The switch 9 is then opened, the switch 16 closed to short circuit condenser 14, the switch 19 closed, and the same operation repeated for coil 5, the variometer 20, potentiometer 21 and condenser 15 being adjusted accordingly. It is necessary, however, that the switch 19 be closed in such direction that the current induced in the circuit of coil 5 flows through the condenser 15 in the same direction as it previously flowed through condenser 14. This direction can be readily observed from the indicator and the reversing switch 19 operated in the proper direction.

When the circuits of coils 4 and 5 have been thus adjusted, the closing of switches 9 and 19 and the opening of switch 16 should not affect the absolute zero reading. If there is a slight variation it may be corrected by changing slightly the adjustment of either of the variometers 10 and 20 or the potentiometers 11 and 21.

If the thus properly adjusted apparatus be placed in a region where terrestrial conducting bodies are likely to be present, it will be found, upon rotation of the coils around an arbitrary axis, that in a certain direction the indicator will register a maximum indication, provided the conducting body is within range of the instrument. If the rotation be repeated around another axis perpendicular to the first one and to the determined direction of maximum indication, a second direction of maximum indication will be found, representing the direction in which the conducting body is situated.

From the foregoing, it will be evident that if the operation of determining the direction in which the conducting body is situated is repeated at a number of different points systematically distributed over the area it is desired to investigate the conducting body can be definitely located, provided, of course, that the secondary field effect is such as to be noticeable on the indicator at the different points.

In order to determine the approximate distance to the conducting body, the instrument is brought into a neutral position with respect to the secondary field effect, either switch 9 or 19 reversed and the corresponding circuit adjusted anew after opening the other switch and closing switch 16 accordingly. If both switches 9 and 19 are then closed and switch 16 opened the secondary currents induced in the circuits of coils 4 and 5 will flow in opposite directions through condensers 14 and 15. No indication therefore will be noticed, even in the direction of maximum secondary induction, if the coils 4 and 5 are situated an equal distance from the conducting body, because the E. M. F's induced in coils 4 and 5 are identical and cause equal voltages across condensers 14 and 15, when the two circuits possess the same constants and are symmetrically adjusted.

However, if the distance from one receiving coil to the conducting body is less than the distance from the other receiving coil to the conducting body, the secondary E. M. F. induced in one coil will differ from that induced in the other, resulting in an unequal voltage distribution across condensers 14 and 15 and a more or less pronounced deviation of the indicator.

Figure 2:
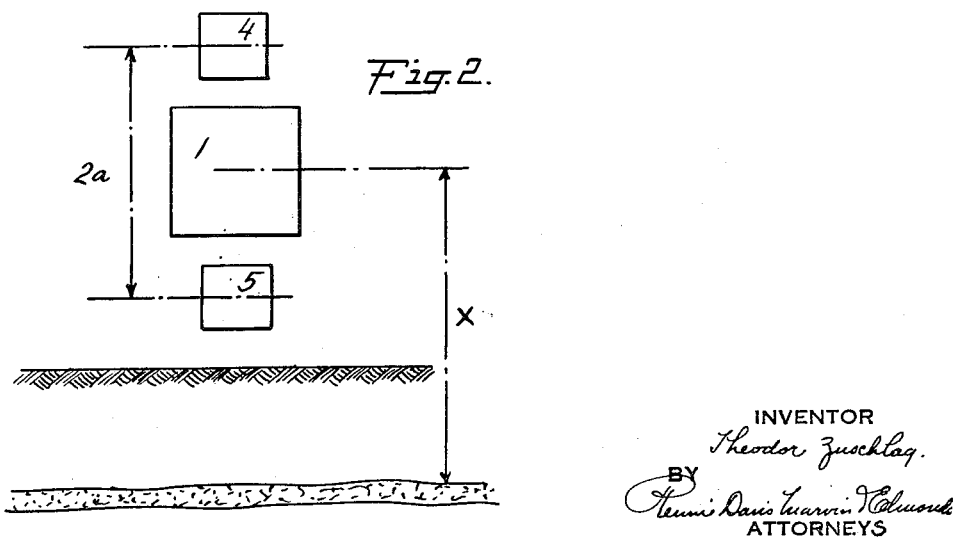
Fig. 2 is a diagrammatic representation of the manner in which the device may be used for distance determinations.

Such a position is diagrammatically illustrated in Fig. 2 wherein the exciter and receiving coils are designated by the same reference characters as in Fig. 1. The distance from the conducting body to the coil 4 will then be $(x-a)$ and to the coil 5 $(x+a)$, where $x$ represents the distance from the center of the balance to the conducting body and $2a$ the distance between the centers of the coils 4 and 5.

It being understood that the ratio of the secondary E. M. F.'s induced in the coils 4 and 5 is dependent upon some function of the distances $a$ and $x$, it will be realized that knowledge of the ratio $E_4/E_5$ will enable me to compute approximately the distance $(x-a)$, provided, of course, the function of the distances $a$ and $x$ is known.

The ratio $E_4/E_5$ can be determined with the help of potentiometer 12, by adjusting it until the indicator gives a zero reading. The deviation of the potentiometer 12 from the previously adjusted neutral position will then indicate in a reverse scale the distance from the balance to the conducting body, that is, the distance $x$. The scale may be determined either by calculation, basing the computation upon the fact that the voltages across condensers 14 and 15 are equal for a zero reading adjustment, or by approximate graduation of the potentiometer during actual tests upon known conducting bodies located at known distances.

By a slightly different arrangement of the compensating devices, my balance may also be used to investigate the relative strength of various secondary fields. For this purpose, the exciter and receiving coils are placed in a neutral position, either switch 9 or 19 is reversed, switch 13 is opened, and either variometer 10 and potentiometer 11 or variometer 20 and potentiometer 21 (depending upon whether switch 9 or 19 is reversed), are brought to their neutral position. The zero reading adjustment is then established by adjusting the other variometer and potentiometer to compensate for the induced primary E. M. F.

If the thus adjusted balance is then brought into the position indicating the direction of maximum secondary induction, the induced secondary E. M. F. can be compensated by means of the variometer and potentiometer not used for the primary field compensation. The deviation of these instruments from their neutral position will then be an indication of the ratio between the induced secondary and exciting primary field strengths. By suitable computation or comparative graduation this ratio may be worked out so as to make possible, for instance, the determination, in an arbitrary scale, of the alternating current conductivity of any conducting body.

While it may be inferred from the foregoing description concerning the illustrated embodiment of the invention that the improved form of induction balance I have disclosed is applicable primarily to the field of electromagnetic prospecting, it is to be understood, as pointed out in an earlier paragraph, that the device of the invention is applicable to other situations as well. Thus, the device, when set up and adjusted as described in connection with Fig. 2, could be placed in an airplane or airship and used as an altitude indicator, provided, of course, the practical limits of the apparatus were not exceeded. That is, if a flight over some terrestrial conducting body such as moist ground, a water course or the sea were in prospect, the apparatus could be adjusted to give a zero reading for some arbitary altitude above such body, below which it would not be safe to fly, say 30—75 feet. Any variation in this distance either through a reduction in the altitude of the air craft or an elevation of the surface of the conducting body would then be apparent through a deviation of the indicator from the zero reading, with the result that the pilot would be warned that his course required changing. Such an arrangement would be of particular value in night flying or fog flying over bodies of water or mountainous regions, because the approach of the surface of the water or the side of a mountain would immediately be made known to the pilot, and the disaster which might otherwise occur thus averted.

I claim:

1. A device for electromagnetically detecting and locating terrestrial conducting bodies, comprising an exciter coil adapted to generate a primary electromagnetic field to induce a secondary field in any conducting body located in the vicinity, a plurality of receiving coils adapted to be inductively influenced by said secondary field, said receiving coils being disposed on opposite sides and in the center of the exciter coil, and compensating means for eliminating any inductive influence of said primary field on said receiving coils.

2. A device for electromagnetically detecting and locating terrestrial conducting bodies, comprising an exciter coil adapted to generate a primary electromagnetic field to induce a secondary field in any conducting body located in the vicinity, a plurality of receiving coils adapted to be inductively influenced by said secondary field, said receiving coils being disposed in the same plane as said exciter coil, and compensating means for eliminating any inductive influence of said primary field on said receiving coils.

3. A device for electromagnetically detecting and locating terrestrial conducting bodies, comprising an exciter coil adapted to generate a primary electromagnetic field to induce a secondary field in any conducting body located in the vicinity, a plurality of receiving coils adapted to be inductively influenced by said secondary field, said receiving coils being disposed in the same plane as said exciter coil and within said primary field, and compensating means connected to said coils and adapted to eliminate any inductive influence of said primary field on said receiving coils.

4. A device as set forth in claim 2, characterized by the provision of means for indicating the extent of the inductive influence of the secondary field on the receiving coils.

5. A device as set forth in claim 2, characterized by the provision of receiving coils disposed on opposite sides of the exciter coil.

6. A device as set forth in claim 2, characterized by the provision of a rotatably mounted exciter coil and receiving coils attached to said exciter coil and rotatable therewith.

7. A device as set forth in claim 2, characterized by the provision of receiving coils disposed on opposite sides of and in the center of the exciter coil.

8. A device as set forth in claim 2, characterized by the provision of receiving coils disposed on opposite sides of the exciter coil in electromagnetically balanced relationship.

9. A device as set forth in claim 2, characterized by the provision of compensating means reactively coupled to the exciter coil.

10. In a method of electromagnetically detecting and locating terrestrial conducting bodies, the steps comprising generating a primary electromagnetic field by means of an exciter coil to induce a secondary field in any conducting body located in the vicinity, disposing a plurality of receiving coils at different points within said induced secondary field, and in the same plane as said exciter coil, compensating for the inductive influence of said primary field on said receiving coils, and measuring the inductive influence of said secondary field on said receiving coils.

11. In the method according to claim 10, the step of measuring the ratio between the E. M. F.'s induced in the receiving coils by the secondary field to determine the distance to the conducting body.

12. In a method of electromagnetically detecting and locating terrestrial conducting bodies, the steps comprising generating a primary electromagnetic field by means of an exciter coil to induce a secondary field in any conducting body located in the vicinity, disposing a plurality of receiving coils adjacent and in the same plane as said exciter coil, compensating for the influence of said primary field on said receiving coils, rotating said exciter and receiving coils about an arbitrary axis until a maximum indication is obtained in an indicator connected to said coils, and rotating said coils about a second axis perpendicular to said first named and to the direction of said maximum indication until a second maximum indication is obtained on the indicator, the direction of said second maximum indication representing the direction in which the conducting body is situated.

13. A device according to claim 2, in which a coupling reactance is connected in series with the winding of the exciter coil.

14. A device according to claim 2, in which two identical receiving coils each enclosing substantially the same area and composed of the same number of turns are arranged on each side of the exciter coil and in the same plane therewith.

15. A device according to claim 2, in which two identical receiving coils each enclosing the same area and composed of the same number of turns are arranged on each side of the exciter coil and in the same plane therewith, and a third receiving coil located within the limits of the exciter coil and likewise in the same plane therewith, said third receiving coil being composed of two separate and equal windings each of which is connected to one of said identical receiving coils.

16. A device according to claim 2, in which each of said receiving coils is connected to a separate reversing switch, one pole of each switch being connected in series with the secondaries of separate variometers and the arms of separate potentiometers.

17. A device according to claim 2, in which each of said receiving coils is connected to a separate reversing switch, one pole of each switch being connected in series with the secondaries of separate variometers and the arms of separate potentiometers, the two potentiometers being connected in series with the primaries of the variometers.

18. A device according to claim 2, in which each of said receiving coils is connected to a separate reversing switch, one pole of each switch being connected in series with the secondaries of separate variometers and the arms of separate potentiometers, the two potentiometers being connected in series with the primaries of the variometers, the centers of said potentiometers being connected to a third potentiometer, the arm of which through a switch connects a common connection of two series variable condensers and to a switch by means of which either of said condensers may be short-circuited, the outer side of each condenser connecting a pole of said reversing switches.

19. A device according to claim 2, in which a coupling reactance is connected in series with the winding of the exciter coil, said coupling reactance being connected in series by means of one lead to a common connection between the primaries of two compensating variometers and by means of a center lead to a common connection between two series potentiometers.

20. A device according to claim 2, in which each of said receiving coils is connected to a separate reversing switch, one pole of each switch being connected in series with the secondaries of separate variometers and the arms of separate potentiometers, the two potentiometers being connected in series with the primaries of the variometers, the centers of said potentiometers being connected to a third potentiometer, the arm of which through a switch connects a common connection of two series variable condensers and to a switch by means of which either of said condensers may be short-circuited, the outer side of each condenser connecting a pole of said reversing switches, a coupling reactance being connected in series with the winding of the exciter coil, said coupling reactance being connected in series by means of one lead to a common connection between the primaries of two compensating variometers and by means of a center lead to a common connection between two series potentiometers.

In testimony whereof I affix my signature.

THEODOR ZUSCHLAG.